(12) United States Patent
Matsunaga

(10) Patent No.: US 11,418,084 B2
(45) Date of Patent: Aug. 16, 2022

(54) GENERATOR

(71) Applicant: HONDA MOTOR CO., LTD., Tokyo (JP)

(72) Inventor: Yoshihiro Matsunaga, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 72 days.

(21) Appl. No.: 17/086,812

(22) Filed: Nov. 2, 2020

(65) Prior Publication Data
US 2021/0159753 A1 May 27, 2021

(30) Foreign Application Priority Data
Nov. 25, 2019 (JP) .............................. JP2019-212591

(51) Int. Cl.
*H02K 5/10* (2006.01)
*F02B 63/04* (2006.01)
*H02K 7/18* (2006.01)

(52) U.S. Cl.
CPC ............. *H02K 5/10* (2013.01); *F02B 63/042* (2013.01); *H02K 7/1815* (2013.01); *H02K 2205/09* (2013.01)

(58) Field of Classification Search
CPC .... H02K 5/10; H02K 7/1815; H02K 2205/09; F02B 63/042
See application file for complete search history.

(56) References Cited

U.S. PATENT DOCUMENTS

| | | | | |
|---|---|---|---|---|
| 2001/0052733 | A1* | 12/2001 | Fujii ........................ | H02K 5/10 310/58 |
| 2015/0181735 | A1* | 6/2015 | Wilson ..................... | H05K 5/03 312/236 |
| 2020/0212765 | A1* | 7/2020 | Takahashi ................ | H02K 5/24 |

FOREIGN PATENT DOCUMENTS

JP 2019-108859 7/2019

* cited by examiner

*Primary Examiner* — Sean Gugger
(74) *Attorney, Agent, or Firm* — Rankin, Hill & Clark LLP

(57) ABSTRACT

A generator includes an inverter cover which receives water intruding into a casing through a ventilation port provided on the casing and going along on a fuel tank existing in a periphery of an inverter to drop toward the inverter.

9 Claims, 9 Drawing Sheets

GENERATOR

INCORPORATION BY REFERENCE

The present application claims priority under 35 U.S.C. § 119 to Japanese Patent Application No. 2019-212591 filed on Nov. 25, 2019. The content of the application is incorporated herein by reference in its entirety.

BACKGROUND OF THE INVENTION

Field of the Invention

The present invention relates to a generator.

DESCRIPTION OF THE RELATED ART

There is known a configuration, for a generator, in which an engine, an alternator, a fuel tank, an inverter and the like are accommodated in a casing which is an exterior casing, for example, the inverter is arranged substantially right below the fuel tank, and the engine, the alternator and the like are arranged in the remaining space. In a generator of this sort, a ventilation port is provided on the casing, outside air is taken in the casing using a cooling fan or the like, and the temperature of components inside is restrained from increasing (for example, see Japanese Patent Laid-Open No. 2019-108859).

SUMMARY OF THE INVENTION

Now, a plurality of harnesses are connected to a circuit, board constituting the inverter via a plurality of couplers, and there can be a case where coupler covers are attached as measures against wetness.

Need for such a plurality of coupler covers, however, increases the number of components, which may be a factor of increase of assembly steps.

Moreover, an investigation by the inventors and their colleagues has revealed that water attaches onto electronic components provided on the circuit board and couplers that coupler covers are not attached to as the water intrudes through the ventilation port of the casing and the intruding water goes along on a component (for example, the fuel tank) in the periphery of the inverter to drop onto the inverter.

Therefore, an object of the present invention is to provide a generator which can restrain an electric equipment unit such as an inverter from suffering water and is also advantageous for reducing the number of components.

In order to achieve the aforementioned object, there is provided a generator that accommodates, in a casing, a plurality of components including an electric equipment unit, wherein a ventilation port is provided on the casing, and a water receptacle part that receives water is arranged in the casing, the water intruding into the casing through the ventilation port and going along on a predetermined component of the plurality of components to drop toward the electric equipment unit, the predetermined component existing in a periphery of the electric equipment unit.

In the aforementioned configuration, an electronic component may be attached to the electric equipment unit, and the water receptacle part may have a guide part that guides the water to a position separate from the electronic component, the guide part including a drain port.

Moreover, in the aforementioned configuration, the guide part may include a gutter part extending toward the drain port, and a slope part having a slope shape allowing the water dropping toward the electric equipment unit to flow to the gutter part.

Moreover, in the aforementioned configuration, the electric equipment unit may include a circuit board to which the electronic component is attached, and an electric equipment casing covering an opposite surface of the circuit board to a surface onto which the electronic component is attached, and the guide part, may be an eave covering an upper side above the electronic component.

Moreover, in the aforementioned configuration, the water receptacle part may have: a sidewall rising from an outer edge of the gutter part; and in a portion, of the sidewall, on an opposite side to the drain port, another drain port that drains the water away at a position lower than an upper surface of the sidewall.

Moreover, in the aforementioned configuration, the water receptacle part may have another guide part that guides water drained away from the other drain port to a position separate from the electronic component.

Moreover, in the aforementioned configuration, the ether guide part may be a component extending downward from the other drain port, and a lower surface of the other guide part may be set to be an inclined surface inclined so as to be lower as separating more from the other drain port.

Moreover, in the aforementioned configuration, the plurality of components may include a fuel tank arranged substantially right above the electric equipment unit, and the water receptacle part may be arranged substantially right below a lowermost part of the fuel tank.

Moreover, in the aforementioned configuration, the water receptacle part may integrally have a tank mount that the fuel tank is placed on.

According to aspects of the present invention, an electric equipment unit can be restrained from suffering water, and there is an advantage of reduction in the number of components.

DETAILED DESCRIPTION OF THE PREFERRED EMBODIMENTS

Hereinafter, an embodiment of the present invention is described with reference to the drawings.

Figure 1:
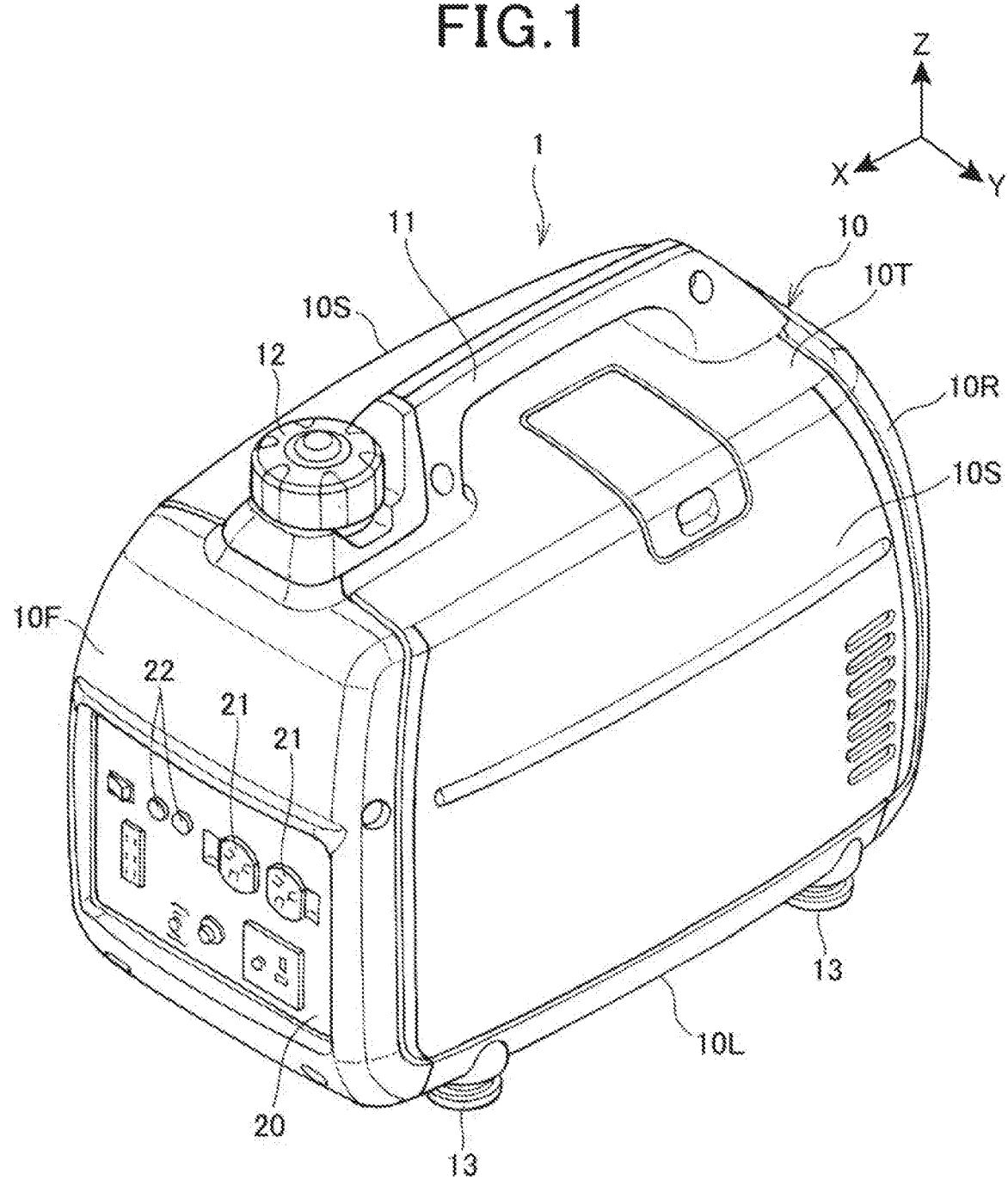
FIG. 1 is a diagram showing an appearance of a generator according to an embodiment of the present invention.

FIG. 1 is a diagram showing an appearance of a generator according to an embodiment of the present invention.

This generator 1 is a portable engine generator small in size, light in weight and relatively easily portable and is covered by a casing 10 formed into a substantially rectangular solid shape.

The casing 10 includes a front cover 10F covering the periphery of a control panel 20 provided on the front surface of the generator 1, side covers 10S constituting the right and left lateral surfaces of the generator 1, a back cover 10B constituting the back surface of the generator 1, a top cover 10T constituting the upper surface of the generator 1, and a bottom cover 10L constituting the lower surface of the generator 1.

Power receptacles 21, operation buttons 22 and the like are arranged on the control panel 20. A handle 11 is integrally provided on the top cover 10T, and a fuel cap 12 is exposed in front of the handle 11. A plurality of foot parts 13 supporting the casing 10 are provided on the bottom cover 10L.

In FIG. 1 and the following figures, the frontward direction is denoted by sign X, the leftward direction is denoted by sign Y, and the upward direction is denoted by sign Z relative to the generator 1 for ease of description. In the description below, directions are described using the directions relative to the generator 1. Notably, such directions may be properly changed depending on the state of installation of the generator 1, the specifications of the generator 1, or the like.

Figure 2:
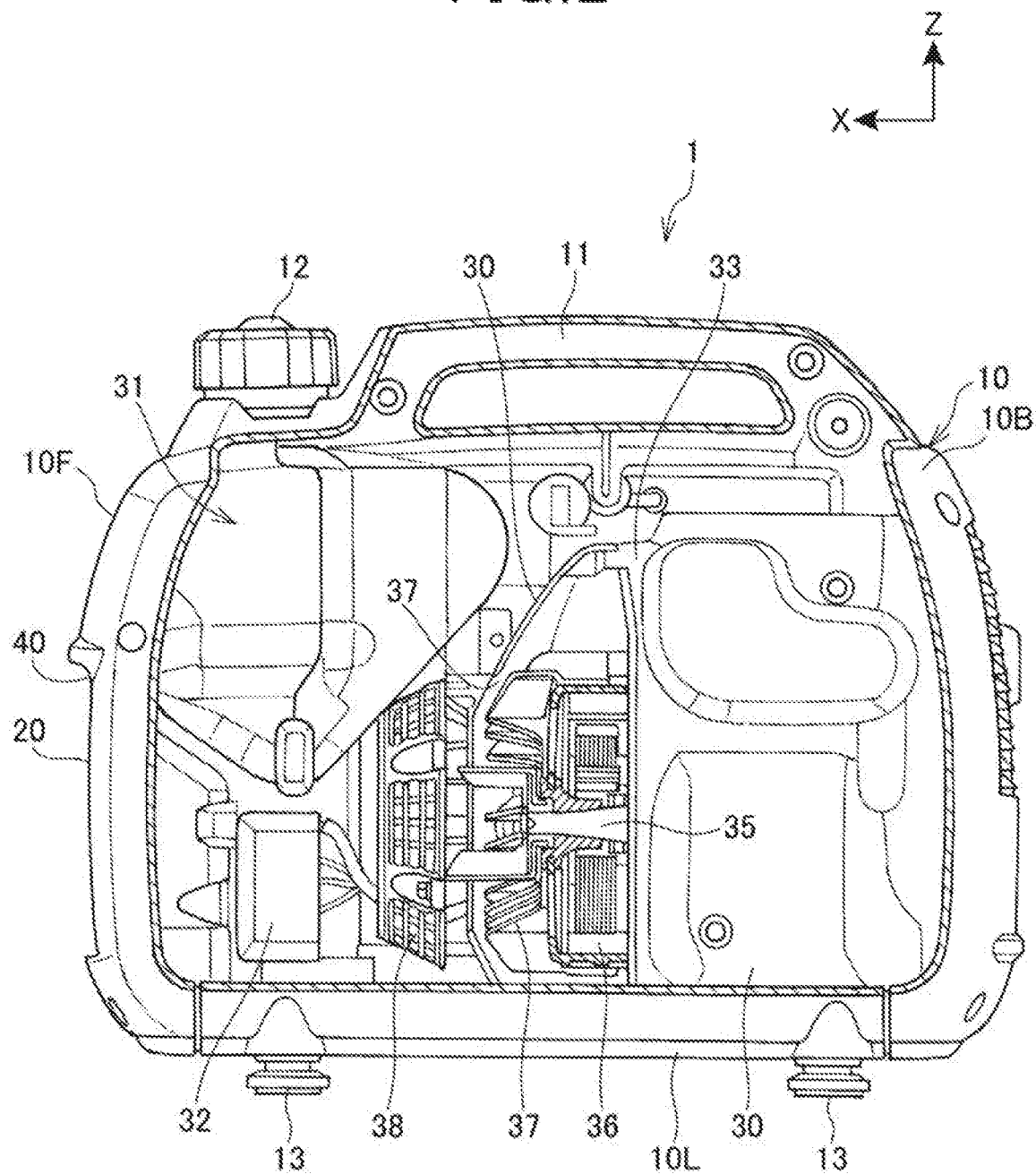
FIG. 2 is a diagram showing an internal configuration of a generator 1.

FIG. 2 is a diagram showing an internal configuration of the generator 1.

An engine 30 is arranged in a rear part of the casing 10, and a fuel tank 31 and an inverter 32 are arranged in the up-down direction in a front part of the casing 10. The engine 30 is enclosed by a shroud 33. The fuel tank 31 is supported by a not-shown frame or the like extending upward from the bottom cover 10L, and thereby, is supported above the bottom cover 10L.

The engine 30 is an internal combustion engine with predetermined liquid fuel such as gasoline being as an energy source and includes an output shaft 35 protruding frontward. An alternator 36 is coupled to the output shaft 35. The alternator 36 generates electric power using driving force of the engine 30 (rotation of the output shaft 35), and the generated power is converted into predetermined electric power by the inverter 32 and is output to the power receptacles 21.

A cooling fan 37 is attached to the tip of the output shaft 35. Moreover, a recoil 38 for starting the engine 30 is arranged in a space between the cooling fan 37 and the inverter 32. The outer peripheral part of the cooling fan 37 is enclosed by a fan cover 39, and the fan cover 35 is continuous to the shroud 33 enclosing the engine 30.

Rotational driving of the engine 30 rotates the cooling fan 37, external air is taken in through a ventilation port 40 which functions as an opening allowing the inside and the outside of the casing 10 to communicate with each other, and the taken-in external air is fed into the shroud 33 through the interior of the fan cover 39. The ventilation port 40 is provided at a front position of the generator 1, more specifically, between the control, panel 20 and the front cover 10F, and the external air cools the inverter 32 and the alternator 36, and after that, cools the engine 30 and the like.

Figure 3:
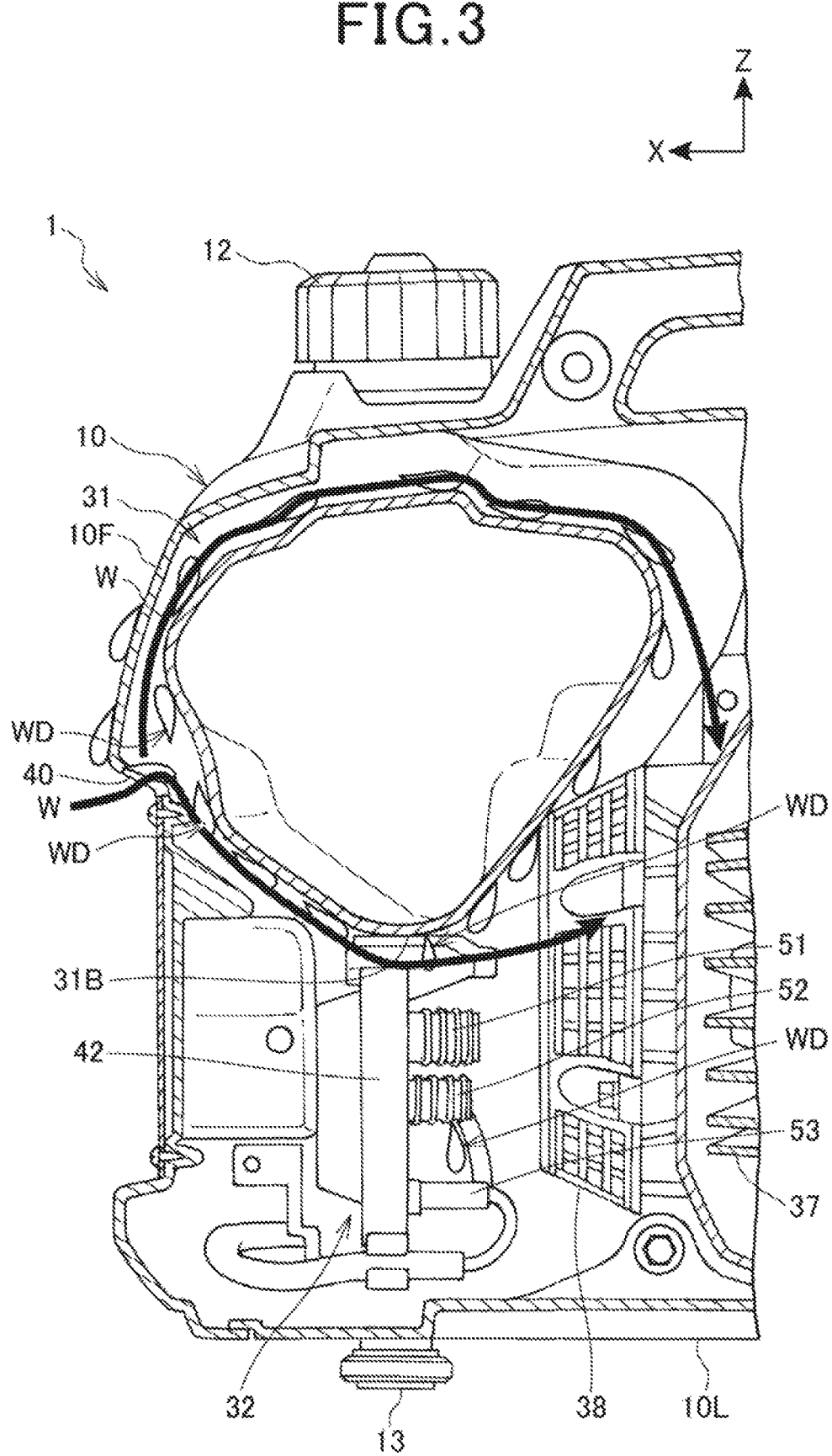
FIG. 3 is a diagram showing an inverter along with a peripheral configuration from a lateral side.
Figure 4:
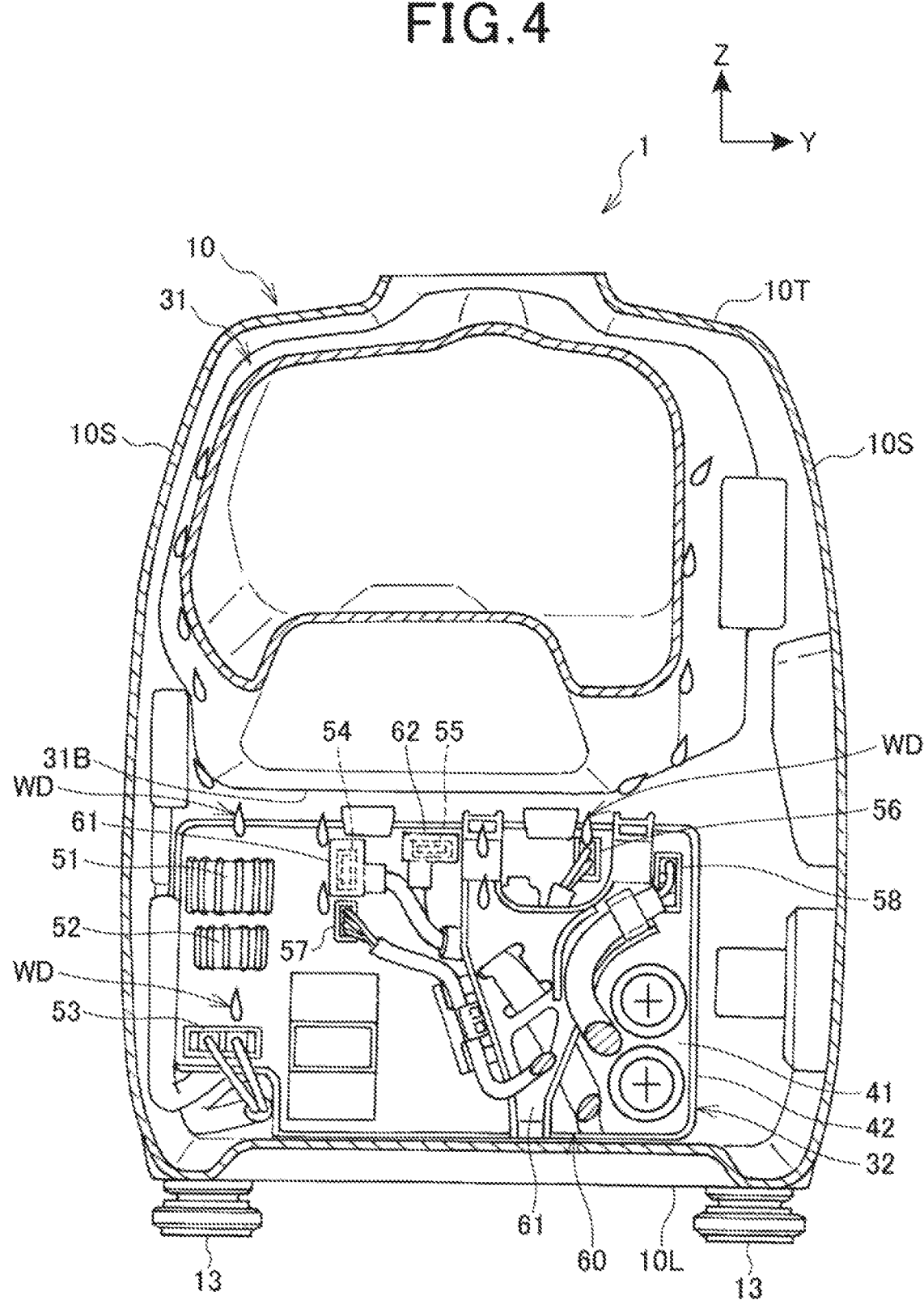
FIG. 4 is a diagram showing the inverter along with a peripheral configuration from a rear side.

FIG. 3 is a diagram showing the inverter 32 along with a peripheral configuration from a lateral side, and FIG. 4 is a diagram showing the inverter 32 along with a peripheral configuration from a rear side.

The inverter 32 has a rectangular plate-like circuit board 41 having an electronic circuit including an inverter circuit and constitutes an electric equipment unit of the generator X. As shown in FIG. 4, the circuit board 41 is arranged in a posture in which its longitudinal direction coincides with the right-left direction (also referred to as width direction) of the generator and its short-side direction coincides with the up-down direction thereof. The circuit board 41 is covered by a metal-made casing 42 (hereinafter referred to as inverter casing 42) from a front side. The space between the inverter casing 42 and the circuit board 41 is filled with a potting material having an insulation property.

As shown in FIG. 4, a plurality of electronic components 51 to 58 are attached to the surface on the back side of the circuit board 41. The electronic components 51 and 52 are coils, and the electronic components 53 to 58 are couplers (also called connectors) provided at the tips of a plurality of harnesses 60 extending from the alternator 36 and the like. When the electronic components 51 to 58 need to be discriminatingly expressed in the description below, they are individually expressed as the coils 51 and 52 and the couplers 53 to 58.

The surface on the back side of the circuit board 41 including these electronic components 51 to 58 is covered by insulating coatings. In FIG. 3, sign 61 denotes a harness support part supporting each of the harnesses 60.

Now, a method of attaching coupler covers to individual couplers is conventionally employed as measures against wetness on the inverter 32. As reference information, FIG. 3 and FIG. 4 show a case where coupler covers 64 and 65 are attached to some couplers 54 and 55 and an inverter cover 70 mentioned later is not attached.

There can be a case, as shown in FIG. 3 and FIG. 4, such as where in the case of taking external air into the casing 10 or the similar case, water WD such as rain water intrudes through the ventilation port 40 (FIG. 3) functioning as an opening communicating with an external space, goes along on the surface of the fuel tank 31, and thereby, drops toward the inverter 32 to attach to any of the electronic components 51 to 58. Notably, arrows denoted by sign W in FIG. 3 indicate flows of the external air.

Since the water WD having intruded through the ventilation port 40 attaches onto the surface of the fuel tank 31 and goes along on the surface of the fuel tank 31 along the flows W of the external air as shown in FIG. 3, the water WD tends to drop from a lowermost part 31B of the fuel tank 31. Therefore, the water WD drops toward the inverter 32 below the fuel tank 31.

There can be a case, as shown in FIG. 4, where part of the dropping water WD ("water WD1, WD2, WD3" in FIG. 4) may attach to the couplers 53 and 56 to 58, the coils 51 and 52 and the like that do not have the coupler covers 64 and 65. There is a concern that the water attached to the couplers 53 and 56 to 58 may attach to metal terminals in the couplers 53 and 56 to 58. Moreover, there is also a concern that if the water contains NaCl (sodium chloride) that is contained in sea water, an antifreezing agent or the like, NaCl may react with insulating coatings of the coils 51 and 52 to decompose part of the insulating coatings.

Figure 5:
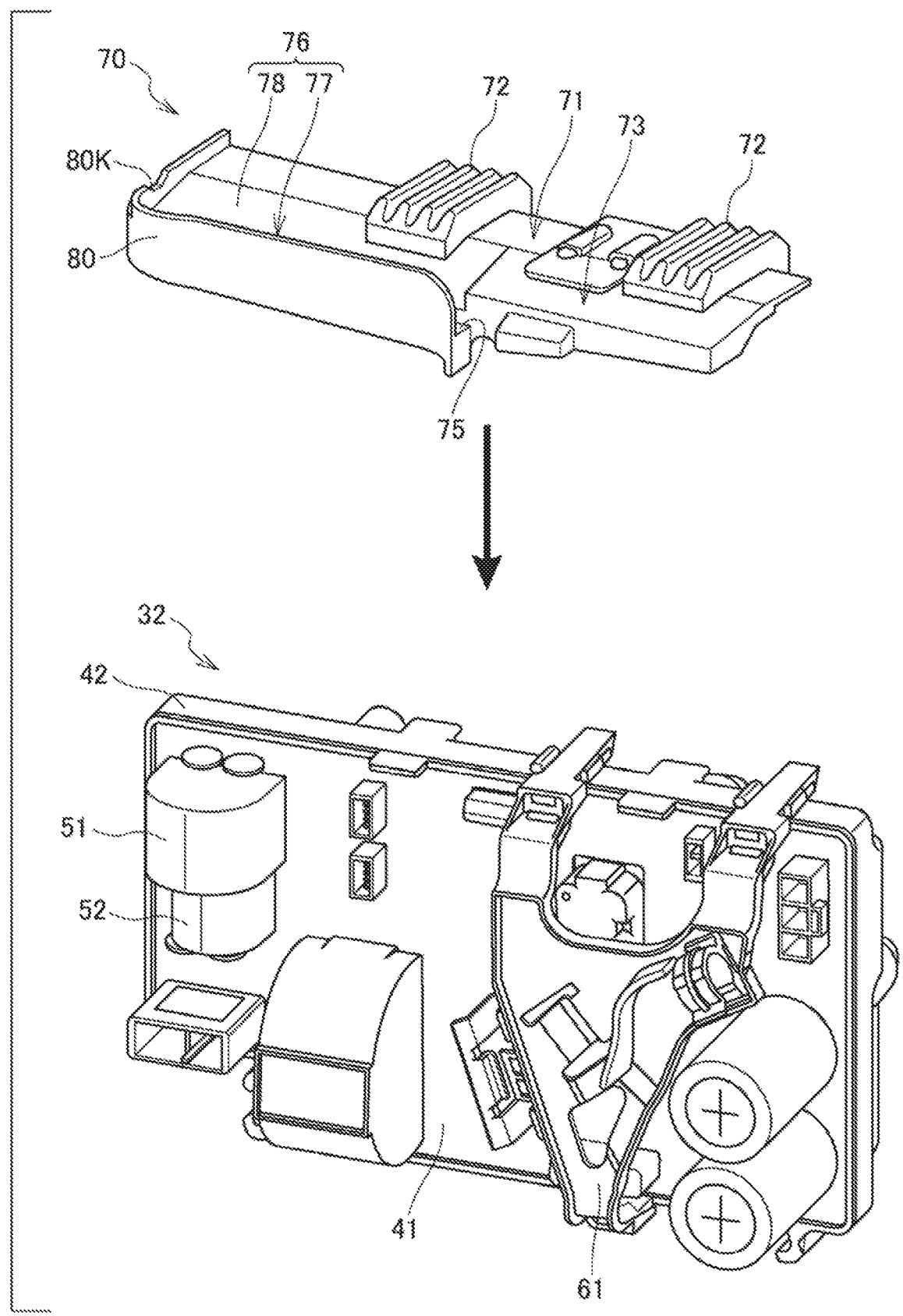
FIG. 5 is a diagram showing an inverter cover along with the inverter.

Therefore, as shown in FIG. 5, the present configuration provides, onto the inverter 32, the inverter cover 70 which receives water dropping from the fuel tank 31.

Figure 6:
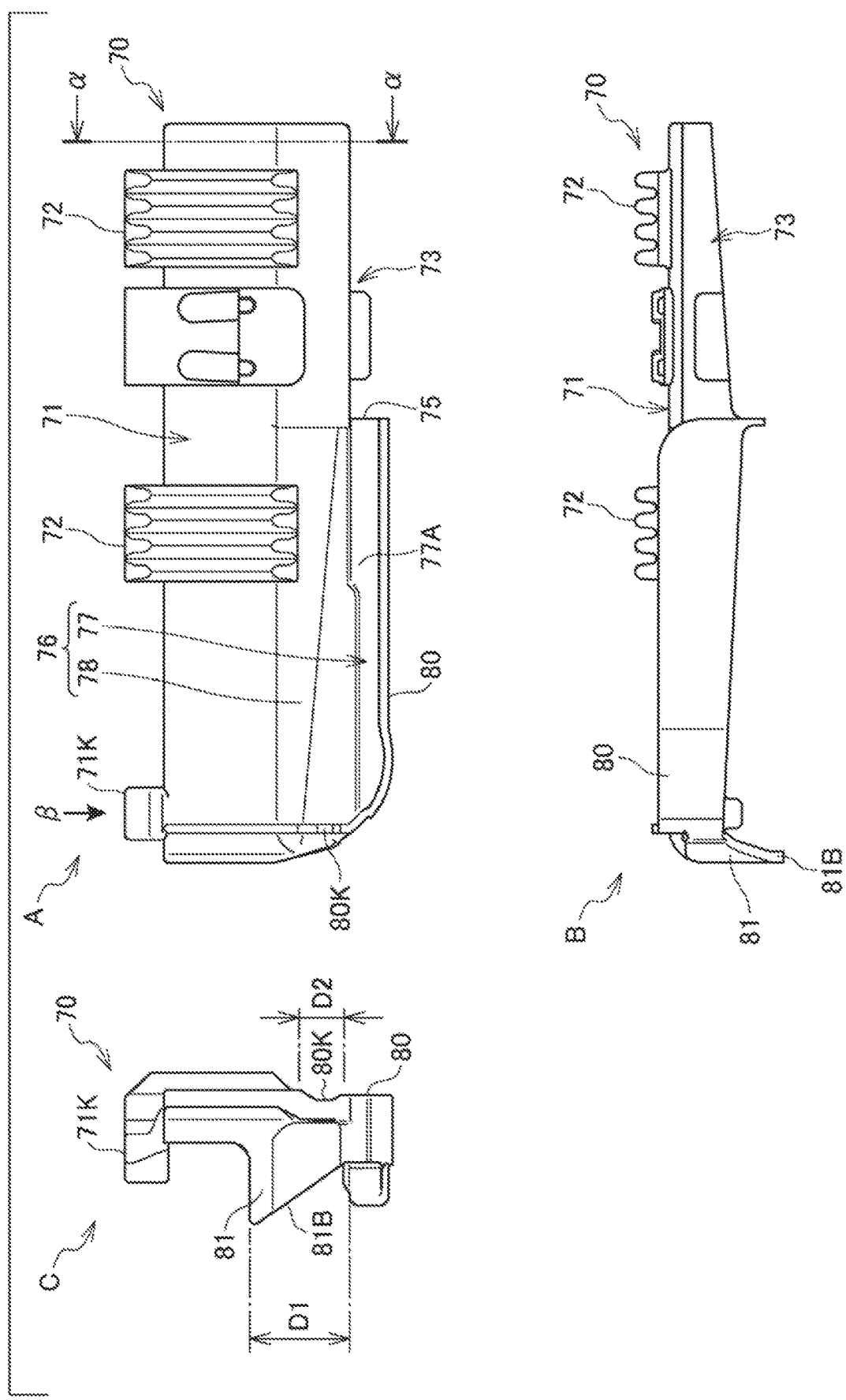
FIG. 6 is a trihedral figure of the inverter cover, sign A denoting a diagram viewed from an upper side, sign B denoting a diagram viewed from a back side, sign C denoting a diagram viewed from a left side.

FIG. 6 shows a trihedral figure of the inverter cover 70, sign A in FIG. 6 denotes a diagram viewed from an upper side, sign B therein denotes a diagram viewed from a back side, and sign C therein denotes a diagram viewed from a left side.

As shown in FIG. 5 and FIG. 6, the inverter cover 70 integrally has a plate-like cover body 71 attached to an upper part of the inverter 32, a pair of right and left tank mounts 72 provided on the cover body 71, and an eave part 73 projecting from, the cover body 71 toward the back side of the generator 1.

The inverter cover 70 is formed by integral molding of synthetic resin having elasticity. Notably, the material of, a manufacturing method of, and the like of the inverter cover 70 may be properly changed.

Figure 7:
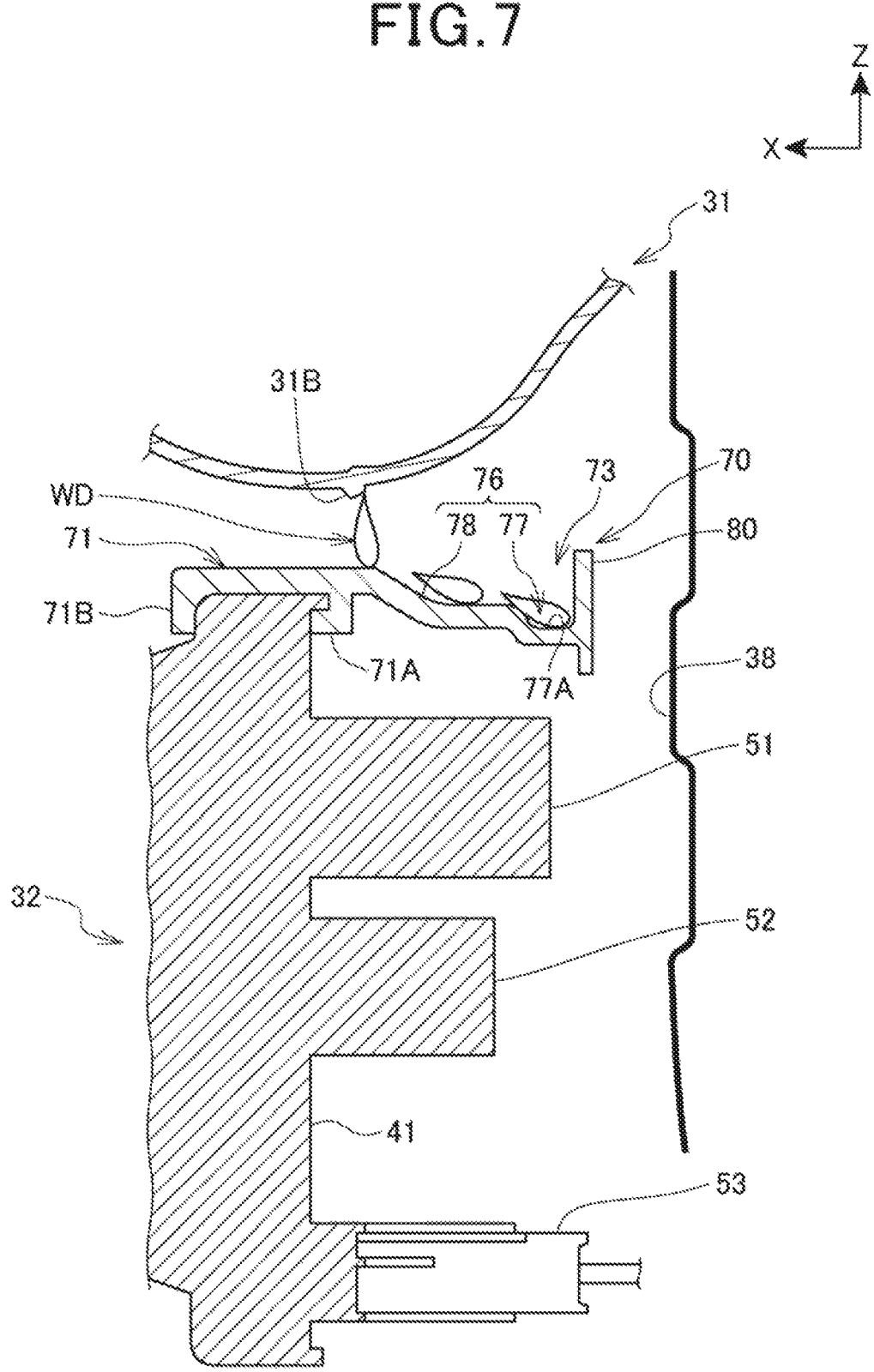
FIG. 7 is a diagram schematically showing an eave part of the inverter cover along with a peripheral configuration.

FIG. 7 is a diagram schematically showing the eave part 73 along with a peripheral configuration when the inverter cover 70 is attached to the inverter 32.

As shown in FIG. 7, the eave part 73 covers an upper side above the plurality of electronic components 51 to 58 provided on the back side of the inverter 32. Thereby, the water WD dropping from the lowermost part 31B of the fuel tank 31 can be restrained from attaching to the plurality of electronic components 51 to 58. Notably, in the present configuration, electronic components other than the electronic components 51 to 58 are also arranged on the back surface of the circuit board 41, and the eave part 73 is sized to cover an upper side above all of the electronic components to which the water WD dropping from the fuel tank 31 possibly attaches.

Hereafter, details of the inverter cover 70 including the eave part 73 are described.

Figure 8:
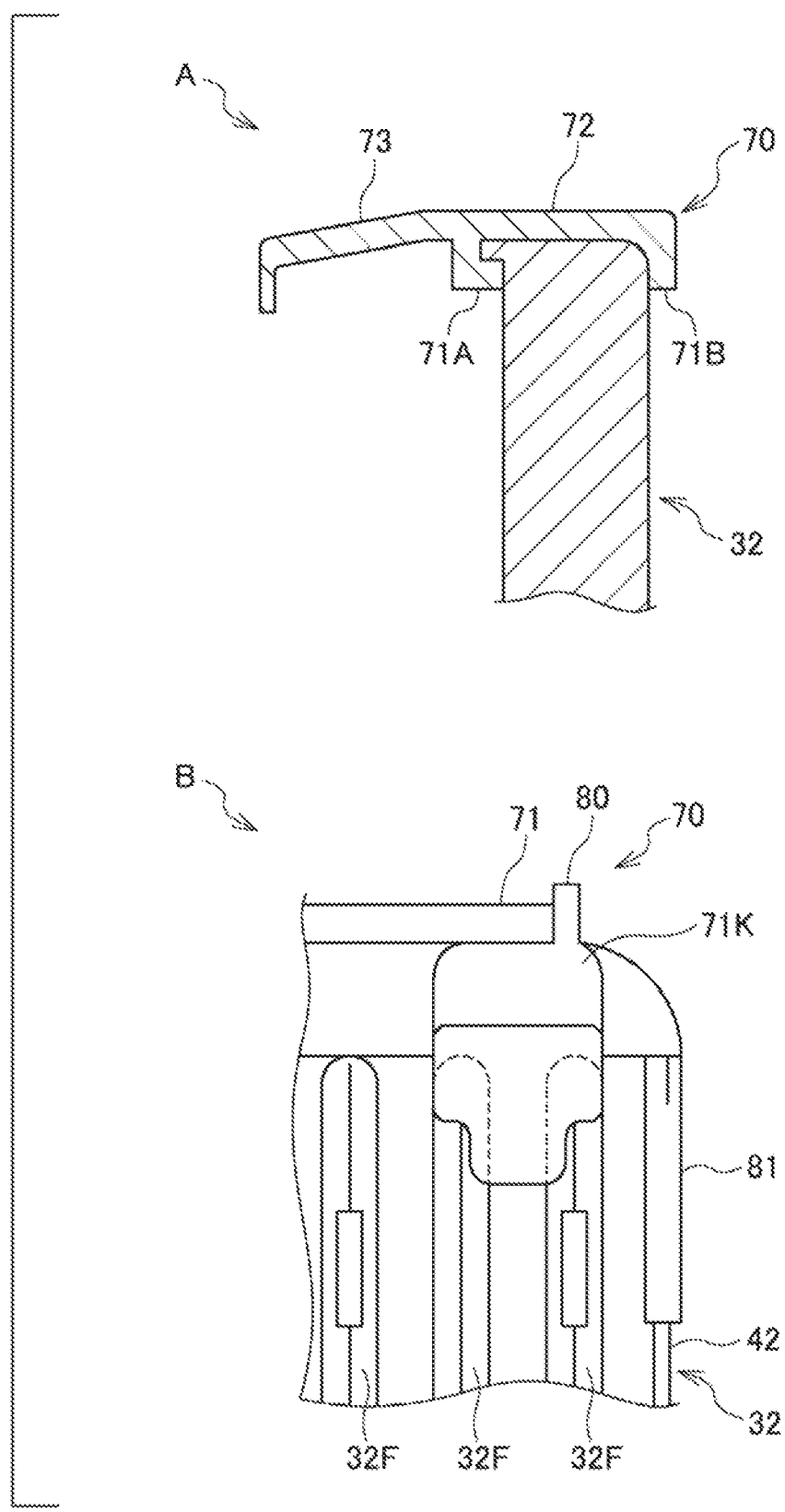
in FIG. 8, sign A denotes a sectional view taken along the α-α line in FIG. 6, and sign B denotes a diagram viewed from the β direction in FIG. 6.

Sign A in FIG. 8 denotes a sectional view taken along the α-α line in FIG. 6, and sign B denotes a diagram viewed from, the β direction in FIG. 6. As denoted by sign A in FIG. 8, the cover body 71 has a pair of clamping parts 71A and 71B which clamp an upper part of the inverter 32 (corresponding to an upper part of the inverter casing 42) in the front-rear direction. The pair of clamping parts 71A and 71B extend in the longitudinal direction of the cover body 71 (Y-direction in FIG. 5), and clamp the upper part of the inverter 32 throughout its Y-directional length. The pair of clamping parts 71A and 71B can be easily opened through elastic deformation of the cover body 71, and the cover body 71 can be attached to the inverter 32 without using a tool.

As denoted by sign B in FIG. 8, a plurality of cooling fins 32F extending in the up-down direction are provided on the front surface of the inverter 32, and an engaging part 71K which engages with any of the cooling fins 32F so as to be able to move in the up-down direction and unable to move in the right-left direction is provided for the cover body 71. The engaging part 71K restrains the inverter cover 70 from moving relative to the inverter 32 in the right-left direction.

As shown in FIG. 5 and FIG. 6, the eave part 73 has a guide part 76 which guides water dropping onto the cover body 71 to a drain port 75. The guide part 76 includes a gutter part 77 extending in substantially parallel to the cover body 71 (in the right-left direction of the generator) rearward of the cover body 71, and a slope part 78 having a slope shape inclined obliquely downward from the cover body 71 toward the gutter part 77.

The gutter part 77 has a recessed groove-like bottom part 77A. (see FIG. 7) extending obliquely downward from any one end of the right and left ones in the cover body 71 (left end in the present configuration) toward the drain port 75 (as described below). Notably, while there is exemplarily presented a case where the drain port 75 is provided at the most downstream end of the gutter part 77, not limited to this, the drain port 75 may be provided at a position closer than the most downstream end of the gutter part 77 or the similar position, and in short, the position of the drain port 75 may be changed within a range within which water can be appropriately drained away.

Figure 9:
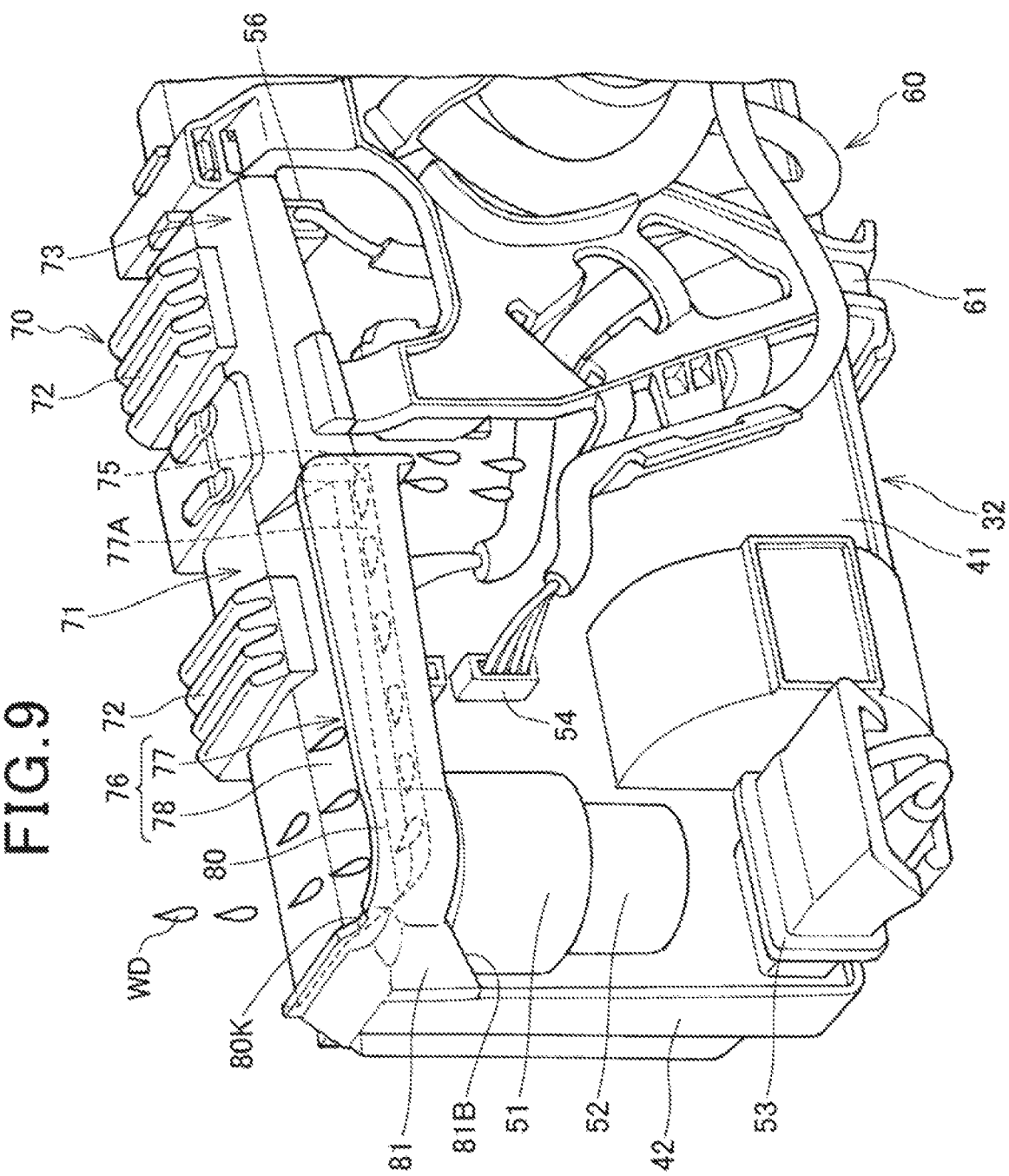
FIG. 9 is a diagram showing flows of water WD dropping to the inverter from a fuel tank.

FIG. 9 is a diagram showing flows of the water WD dropping to the inverter 32 from the fuel tank 31.

As shown in FIG. 9, the water WD dropping from the fuel tank 31 drops onto the cover body 71 or the slope part 78 and is guided to the gutter part 77 by the slope part 78. The water WD flowing to the gutter part 77 is collected to the bottom part 77A of the gutter part 77, flows along the inclination of the bottom part 77A to the drain port 75, and drops downward from the drain port 75.

Here, the drain port 75 of the inverter cover 70 is set to be at a position separate from the electronic components 51 to 58 in at least any of the front-rear direction and the right-left direction. As shown in FIG. 8, the drain port 75 in the present configuration is set to be at a position which is rearward of the circuit board 41, is near the center of the inverter 32 in the right-left direction of the circuit board 41, and is separate from the harness support part 61. Thereby, the water dropping from the drain port 75 does not attach to the electronic components 51 to 58 or the like, and flows to a not-shown drain hole provided in the bottom cover 10L of the casing 10. Notably, since in the case of using the inverter cover 70, a position where water drops is set to be a position which is kept away from the couplers 53 to 58, any coupler covers are not needed.

As shown in FIG. 5, FIG. 6 and FIG. 9, the inverter cover 70 includes a sidewall 30 which has a substantially L shape in top view, rises upward from the outer peripheral edge of the gutter part 77, and extends along the left edge part of the inverter cover 70.

The sidewall 80 rises upward of the cover body 71, the slope part 78 and the bottom part 77A to effectively prevent a situation that water positioned on the cover body 71, the slope part 78, and the bottom part 77A of the gutter part 77 drops off the inverter cover 70 before reaching the drain port 75 from occurring. Moreover, even when the generator 1 is installed to be inclined in the front-rear direction, a situation in which water on the inverter cover 70 flows out over the sidewall 80 side can be restrained from occurring. Furthermore, since the sidewall 30 extends along the outer peripheral edge of the inverter cover 70 and bends to be L-shaped, it also functions as a reinforcement rib reinforcing the inverter cover 70.

Moreover, a notch part 80K obtained by downward notching is provided in a portion, of the sidewall 80, on the opposite side to the drain port 75 (see sign C in FIG. 6). When the generator is so inclined that the water in the gutter part 77 flows to the opposite side to the drain port 75, the water collected to the gutter part 77 is drained away from the notch part 80K. Thereby, water can be drained away from the notch part. 80K before the water flows over the upper end of the sidewall 80. In other words, even when water in the gutter part 77 flows to the opposite side to the drain port 75, a place where the water is drained away can be controlled, and the water can be easily drained away to a place where the water is less likely to be problematic.

As shown in FIG. 9, a downward protruding part 81 extending downward below the notch part 80K is formed on the sidewall 80. A lower surface 81B of the downward protruding part 81 is formed to be an inclined surface which becomes lower as separating more from the notch part 80K in any of the frontward direction and the rearward direction (frontward direction of the generator 1 in the present embodiment). Thereby, when water flows out from the notch part 80K, the water can flow along the lower surface 81B of the downward protruding part 81 to drop from the lowermost end of the downward protruding part 81. A position where it drops from the lowermost end of the downward protruding part 81 is set to be a position where water does not attach to the electronic components and the couplers and flows to a not-shown drain hole provided in the bottom cover 10L of the casing 10.

Namely, the downward protruding part 81 functions as another guide part which guides water drained away from the notch part 80K to a position separate from the electronic components 51 to 58 and the like.

Since as denoted by sign C in FIG. 6, a range D1 of the downward protruding part 81 is set to be a wide range which goes over a range D2 of the notch part 80K in the front-rear direction, even when water flowing out from the notch part 80K is somewhat displaced in the front-rear direction, it can be guided to the position of the lowermost end position of the downward protruding part 81.

As described above, the generator 1 of the present embodiment includes the inverter cover 70 which functions as a water receptacle part receiving water which intrudes into the casing 10 through the ventilation port 40 provided in the casing 10 and goes along on the fuel tank 31 existing in a periphery of the inverter 32 which is an electric equipment unit to drop toward the inverter 32. Thereby, the inverter 32 can be restrained from suffering water, and the number of components can be more easily reduced compared to the case of using coupler covers.

Moreover, since the inverter cover 70 has the guide part 76 which guides water having dropped to a position separate from the electronic components 51 to 58 provided in the inverter 32, the guide part 76 having the drain port 75, a situation in which that the electronic components 51 to 58 suffer water upon draining of the water can be retrained from occurring.

Furthermore, since the guide part 76 includes the gutter part 77 extending toward the drain port 75, and the slope part 78 having a slope shape allowing water dropping toward the inverter 32 to flow to the gutter part 77, the water can be allowed to efficiently flow to the drain port 75.

Moreover, the inverter 32 includes the circuit board 41 to which the electronic components 51 to 58 are attached, and the inverter casing 42 which functions as an electric equipment casing covering a surface, of the circuit board 41, opposite to a surface onto which the electronic components 51 to 58 are attached. Further, the guide part 76 functions as an eave covering an upper side above the electronic components 51 to 58. Accordingly, the inverter casing 42 and the inverter cover 70 prevent the whole inverter 32 including the electronic components 51 to 58 from suffering water.

Moreover, the inverter cover 70 has the sidewall 80 rising from the outer edge of the gutter part 77, and has the notch part 80K which functions as another drain port in a portion, of the sidewall 80, on the opposite side to the drain port 75. Thereby, when the generator 1 is so inclined that water in the gutter part 77 flows out of the opposite side to the drain port 75, the water can be drained away from the notch part 80K, and the position where the water is drained away can be controlled to be an appropriate position.

Notably, not limited to the configuration of the notch part 80K obtained by downward notching, any configuration may be used as such another drain port, as long as it drains water away at a position lower than the upper surface of the sidewall 80, For example, the other drain port may be a through hole provided at a position lower than the upper surface of the sidewall 80. Notably, the other drain port 75 is preferably set to be at a position higher than the lower surface of the drain port 75 of the gutter part 77 in the state where the generator 1 is placed on the horizontal plane.

Moreover, the inverter cover 70 has the downward protruding part 81 which functions as another guide part which guides water drained away from the notch part 8OK to a position separate from the electronic components 51 to 58. Accordingly, when the generator is so inclined that water in the gutter part 77 flows out of the opposite side to the drain port 75, a position where the water drained away from the notch part 80K drops can be more easily controlled to be an appropriate position.

In addition, since the downward protruding part 81 extends downward from the notch part 80K and the lower surface 81B of the downward protruding part 81 is formed to be an inclined surface inclined so as to be lower as separating more from the notch part 80K, a position where the water drained away from the notch part 80K drops can be controlled with a simple configuration.

Moreover, since the plurality of components accommodated in the casing 10 of the generator 1 includes the fuel tank 31 substantially right above the Inverter 32 and the inverter cover 70 is arranged substantially right below the lowermost part 31B of the fuel tank 31, the inverter 32 can be prevented from suffering water by the inverter cover 70 receiving water dropping from the lowermost part 31B of the fuel tank 31. In addition, since the inverter cover 70 integrally has the tank mounts 72 which the fuel tank 31 is placed on, the number of components can be restrained from increasing, and the inverter cover 70 and the tank mounts 72 can be easily attached and detached.

The aforementioned embodiment is merely an aspect of the present invention being carried out and any modifications and applications thereof may occur without departing from the spirit and scope of the present invention.

For example, while there has been presented for the aforementioned embodiment a case of providing the inverter cover 70 which receives water dropping from the fuel tank, it is not limited to this. There may be provided the inverter cover 70 substantially right below a component out of the plurality of components in the casing 10, the component allowing water intruding through the ventilation port 40 to drop onto the inverter 32.

Moreover, while there has been described a case of providing the inverter cover 70 which restrains the inverter 32 from suffering water, not limited to this, the technology of the present invention may be applied to a case of preventing an electric equipment unit other than the inverter 32 from suffering water.

Moreover, while there has been described a case of applying the present invention to the generator 1 disclosed in FIG. 1 and the like, the present invention may be applied to any known generator.

REFERENCE SIGNS LIST

1 generator
10 Casing
31 Fuel tank
32 Inverter (electric equipment unit)
40 Ventilation port
41 Circuit board
42 Inverter casing (electric equipment, casing)
51 to 58 Electronic components
70 Inverter cover
71 Cover body
72 Tank mount
73 Eave part 75 Drain port
76 Guide part
77 gutter part
78 Slope part
80 Sidewall
80K Notch part (another drain port)
81 Downward protruding part (another guide part)
81B Lower surface of the downward protruding part

What is claimed is:

1. A generator that accommodates, in a casing, a plurality of components including an electric equipment unit, wherein
a ventilation port is provided on the casing, and
a water receptacle part that receives water is arranged in the casing, the water intruding into the casing through the ventilation port and going along on a predetermined component of the plurality of components to drop toward the electric equipment unit, the predetermined component existing in a periphery of the electric equipment unit,
an electronic component is attached to the electric equipment unit,
the water receptacle part has a guide part that guides the water to a position separate from the electronic component, the guide part including a drain port,
the electric equipment unit includes a circuit board to which the electronic component is attached, and an electric equipment casing covering an opposite surface of the circuit board to a surface onto which the electronic component is attached, and
the guide part is an eave covering an upper side above the electronic component.

2. The generator according to claim 1, wherein the guide part includes a gutter part extending toward the drain port, and a slope part having a slope shape allowing the water dropping toward the electric equipment unit to flow to the gutter part.

3. The generator according to claim 2, wherein
the water receptacle part has:
a sidewall rising from an outer edge of the gutter part; and
in a portion, of the sidewall, on an opposite side to the drain port, another drain port that drains the water away at a position lower than an upper surface of the sidewall.

4. The generator according to claim 3, wherein the water receptacle part has another guide part that guides water drained away from the other drain port to a position separate from the electronic component.

5. The generator according to claim 4, wherein
the other guide part is a component extending downward from the other drain port, and
a lower surface of the other guide part is set to be an inclined surface inclined so as to be lower as separating more from the other drain port.

6. The generator according to claim 1, wherein
the plurality of components include a fuel tank arranged substantially right above the electric equipment unit, and
the water receptacle part is arranged substantially right below a lowermost part of the fuel tank.

7. The generator according to claim 6, wherein the water receptacle part integrally has a tank mount that the fuel tank is placed on.

8. A generator that accommodates, in a casing, a plurality of components including an electric equipment unit, wherein
a ventilation port is provided on the casing, and
a water receptacle part that receives water is arranged in the casing, the water intruding into the casing through the ventilation port and going along on a predetermined component of the plurality of components to drop toward the electric equipment unit, the predetermined component existing in a periphery of the electric equipment unit,
an electronic component is attached to the electric equipment unit,
the water receptacle part has a guide part that guides the water to a position separate from the electronic component, the guide part including a drain port,
the guide part includes a gutter part extending toward the drain port, and a slope part having a slope shape allowing the water dropping toward the electric equipment unit to flow to the gutter part,
the water receptacle part has a sidewall rising from an outer edge of the gutter part, and in a portion of the sidewall, on an opposite side to the drain port, another drain port that drains the water away at a position lower than an upper surface of the sidewall,
the water receptacle part has another guide part that guides water drained away from the other drain port to a position separate from the electronic component,
the other guide part is a component extending downward from the other drain port, and
a lower surface of the other guide part is set to be an inclined surface inclined so as to be lower as separating more from the other drain port.

9. A generator that accommodates, in a casing, a plurality of components including an electric equipment unit, wherein
a ventilation port is provided on the casing, and
a water receptacle part that receives water is arranged in the casing, the water intruding into the casing through the ventilation port and going along on a predetermined component of the plurality of components to drop toward the electric equipment unit, the predetermined component existing in a periphery of the electric equipment unit,
the plurality of components include a fuel tank arranged substantially right above the electric equipment unit,
the water receptacle part is arranged substantially right below a lowermost part of the fuel tank, and
the water receptacle part integrally has a tank mount that the fuel tank is placed on.

* * * * *